C. L. CULBERT.
POWER MECHANISM.
APPLICATION FILED SEPT. 8, 1914.

1,222,186.

Patented Apr. 10, 1917.

Witnesses:
Charles E. Garitee
Geo. E. Wilson

Inventor:
Charles L. Culbert
By Chapin & Ferguson
Attorney

UNITED STATES PATENT OFFICE.

CHARLES L. CULBERT, OF BALTIMORE, MARYLAND.

POWER MECHANISM.

1,222,186. Specification of Letters Patent. Patented Apr. 10, 1917.

Application filed September 8, 1914. Serial No. 860,516.

*To all whom it may concern:*

Be it known that I, CHARLES L. CULBERT, a citizen of the United States, residing at Baltimore, in the State of Maryland, have invented certain new and useful Improvements in Power Mechanisms, of which the following is a specification.

This invention relates to improvements in power mechanism, and has for its object to provide a simple, cheap and efficient device for generating power to be conveyed to any desired point and for any desired purpose.

The invention consists of the novel construction and arrangement of the parts and combination of parts hereinafter more fully set forth in the following specification and pointed out in detail in the appended claim.

In the accompanying drawings,—

Figure 1:
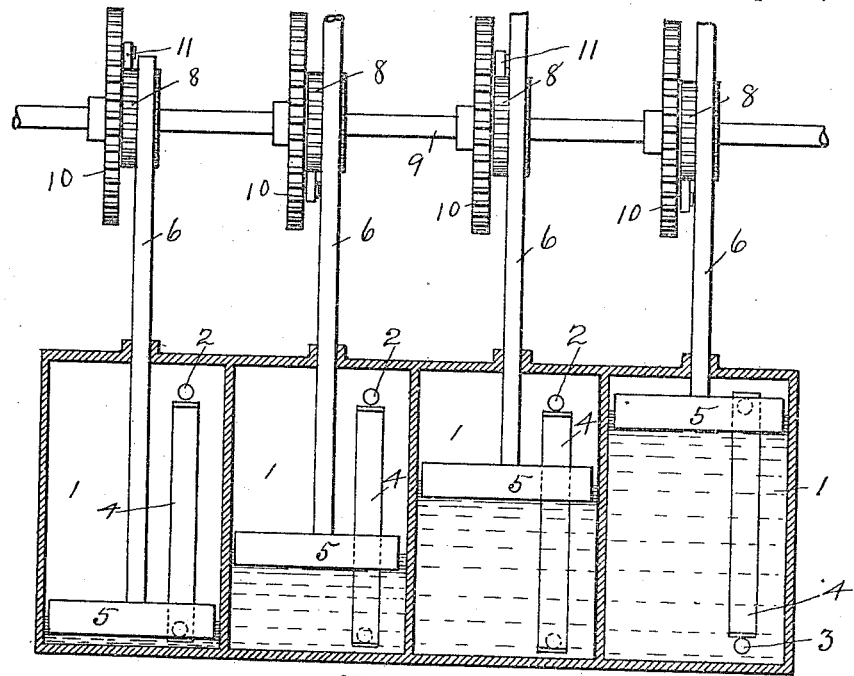
Figure 1 is an elevation, partly in section, showing my invention.
Figure 2:
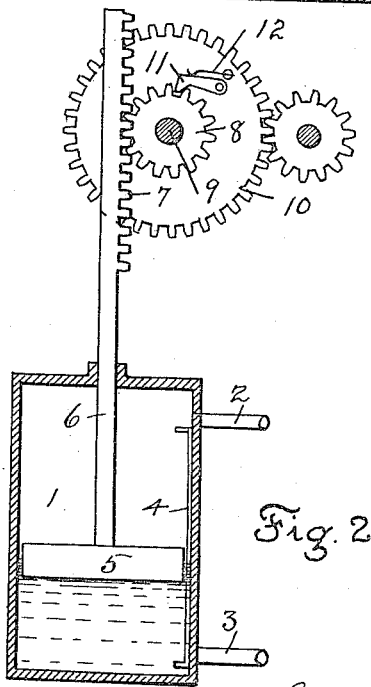
Fig. 2 is an end view of Fig. 1.

Referring to the accompanying drawings, forming part of this specification, and in which like reference numerals designate like parts throughout the several views, 1 designates the water tanks, which are each provided with an inlet 2 and an outlet 3 controlled by the slide valves 4. Said slide valves 4 each have their ends bent at right angles so that the floats 5 come into contact therewith to open and close the said inlets 2 and outlets 3. Within each of the tanks 1 is a float 5 having an upright 6 provided with a rack 7 on one side thereof in mesh with the small cog-wheel 8 which latter is loose on the shaft 9. Adjacent the cog-wheel 8 is a large cog-wheel 10 fixed to said shaft and carrying a pawl 11 one end of which is held in mesh with the teeth of the cog-wheel 8 by a spring 12. The shaft 9 is arranged above the tanks 1 and has a cog-wheel 10 for each tank. The water in the tanks is kept at different levels, as shown in Fig. 1, so that the uprights will work serially, whereby some of said uprights are always in operation to revolve the said shaft.

The water flows into the tanks 1 through the inlet 2 and raises the floats 5 which carry the uprights 6 upwardly and cause the cog-wheels 8, and consequently the shaft 9, to revolve. When the floats strike the upper end of the slide-valve 4 the latter is raised which uncovers the outlet 3 and allows the water to flow from the tank, and as the float 5 lowers and nears the bottom of the tank it strikes the lower end of the slide valve causing it to close the outlet 3 and open the inlet 2. This is repeated by the action of the water serially in each tank.

Having thus described my invention, what I claim is:

A power mechanism comprising a plurality of tanks each having an inlet and an outlet, an independently-operated float in each of said tanks, a rack connected to each of said floats and projecting through the top of the tanks, a shaft mounted above said tanks, a number of cog-wheels fast on said shaft and each in mesh with one of said racks, a slide valve in each tank having its upper and lower ends bent at right angles and adapted to contact with the floats to open and close the inlet and outlets, whereby two or more of said racks will be operated simultaneously.

In testimony whereof I affix my signature in presence of two witnesses.

CHARLES L. CULBERT.

Witnesses:
CHAPIN A. FERGUSON,
CHARLES E. GARITEE.

Copies of this patent may be obtained for five cents each, by addressing the "Commissioner of Patents, Washington, D. C."